US011060865B1

(12) United States Patent
Huang et al.

(10) Patent No.: US 11,060,865 B1
(45) Date of Patent: Jul. 13, 2021

(54) DISK RESONATOR GYROSCOPE (DRG) WITH ENGINEERED RADIAL STIFFNESS FOR HIGH ANCHOR QUALITY FACTOR (Q)

(71) Applicant: HRL Laboratories, LLC, Malibu, CA (US)

(72) Inventors: Lian X. Huang, Thousand Oaks, CA (US); Hung Nguyen, Los Angeles, CA (US); Raviv Perahia, Agoura Hills, CA (US); Logan D. Sorenson, Thousand Oaks, CA (US); Patrick J. Webb, Los Angeles, CA (US); David T. Chang, Calabasas, CA (US)

(73) Assignee: HRL Laboratories, LLC, Malibu, CA (US)

( * ) Notice: Subject to any disclaimer, the term of this patent is extended or adjusted under 35 U.S.C. 154(b) by 140 days.

(21) Appl. No.: 16/389,462

(22) Filed: Apr. 19, 2019

Related U.S. Application Data

(60) Provisional application No. 62/669,326, filed on May 9, 2018.

(51) Int. Cl.
*G01C 19/5712* (2012.01)
(52) U.S. Cl.
CPC ................................ *G01C 19/5712* (2013.01)
(58) Field of Classification Search
CPC .................................................. G01C 19/5712
USPC ....................................................... 73/504.13
See application file for complete search history.

(56) References Cited

U.S. PATENT DOCUMENTS

| 7,581,443 B2 | 9/2009 | Kubena et al. | |
| 2005/0172714 A1* | 8/2005 | Challoner | G01C 19/5684 73/504.12 |
| 2016/0123735 A1* | 5/2016 | Gregory | G01C 19/5684 73/504.13 |

OTHER PUBLICATIONS

"Effect of structural anisotropy on anchor loss mismatch and predicted case drift in future micro-Hemispherical Resonator Gyros. Record", Sorenson, Logan & Ayazi, Farrokh (2014), IEEE Plans, Position Location and Navigation Symposium. 493-498, 10.1109/PLANS.2014.6851408.

* cited by examiner

*Primary Examiner* — Tarun Sinha
(74) *Attorney, Agent, or Firm* — Ladas & Parry

(57) ABSTRACT

Dimensions of a disk resonator gyroscope along the radial line of a resonator can be varied to engineer radial stiffness. An apparatus may comprise: a resonator comprising a plurality of concentric circumferential segments and a plurality of slots formed between the concentric circumferential segments; and at least one support supporting the resonator, wherein a width, in a radial direction, of each of the concentric circumferential segments is varied depending on a distance from the at least one support to the each of the concentric circumferential segments. The apparatus may further comprise radial segments connecting between the concentric circumferential segments. The concentric circumferential segments may have a ring shape.

20 Claims, 27 Drawing Sheets

DISK RESONATOR GYROSCOPE (DRG) WITH ENGINEERED RADIAL STIFFNESS FOR HIGH ANCHOR QUALITY FACTOR (Q)

CROSS REFERENCE TO PARENT APPLICATION

This application claims the benefit of U.S. Patent Application Ser. No. 62/669,326, filed on May 9, 2018, entitled "DISK RESONATOR GYROSCOPE (DRG) WITH ENGINEERED RADIAL STIFFNESS FOR HIGH ANCHOR QUALITY FACTOR (Q)", which is hereby incorporated by reference in its entirety.

TECHNICAL FIELD

Some embodiments of the present disclosure relate to gyroscopes, and, in particular, to resonator gyroscopes or inertial sensors comprising concentric circumferential segments and slots with variable widths, for example, but not limited to, a high Quality-factor (Q-factor) Micro-Electro-Mechanical Systems (MEMS) Disk Resonator Gyroscope varying dimensions along the radial line of the resonator.

BACKGROUND

Resonant devices, such as resonant vibratory devices and sensors, have served various technical functions in many industries. For example, resonant devices, such as oscillators, vibratory sensors, gyroscopes and vibratory accelerometers, have been adapted in various applications. Gyroscopes are used to determine a motion direction of a moving platform based on the sensed inertial reaction of an internally moving proof mass. A typical electromechanical gyroscope comprises a suspended proof mass, gyroscope case, pickoffs or sensors, torquers or actuators, and readout electronics. The inertial proof mass is internally suspended from the gyroscope case that is rigidly mounted to the platform and communicates the inertial motion of the platform while otherwise isolating the proof mass from external disturbances. The pickoffs to sense the internal motion of the proof mass, the torquers to maintain or adjust this motion and the readout electronics that are in close proximity to the proof mass are internally mounted to the case which also provides the electrical feedthrough connections to the platform electronics and power supply. The case also provides a standard mechanical interface to attach and align the gyroscope with the vehicle platform. In various forms gyroscopes are often employed as a critical sensor for vehicles such as aircraft and spacecraft. They are generally useful for navigation or whenever it is necessary to autonomously determine the orientation of a free object.

Resonator structures comprising a disk using electrostatic electrodes for excitation and sensing have been developed for micro-gyroscope applications. One example of disk resonator gyroscopes (DRGs) can be found in U.S. Pat. No. 7,581,443, which is hereby incorporated by reference in its entirety. Generally, the conventional DRGs may comprise a plurality of concentric rings interconnected to make up a disk. For example, the concentric rings of the DRG may be fabricated by etching to slot a disk into a structure of interconnected rings supported at a central anchor. As illustrated in FIGS. 1A-1C, the concentric rings of the conventional DRGs may have uniform ring widths from the central anchor to an outmost ring. However, the conventional DRGs having uniform ring and slot widths may be subjected to high anchor loss due to drastic drop in ring stiffness from the central anchor to the middle portion of the resonator as shown in FIG. 1D. Furthermore, conventional DRGs having uniform narrow ring widths have low working frequencies. DRGs having a uniform ring width can increase the working frequency by increasing the uniform width of the rings, but this may drop the Quality-factor (Q-factor). The uniform width design of the conventional DRG may also have a sharp drop in stiffness even with larger ring width.

It is with respect to these and other general considerations that the following embodiments have been described. Also, although relatively specific problems have been discussed, it should be understood that the embodiments should not be limited to solving the specific problems identified in the background.

SUMMARY

The features and advantages of the present disclosure will be more readily understood and apparent from the following detailed description, which should be read in conjunction with the accompanying drawings, and from the claims which are appended to the end of the detailed description.

Various exemplary embodiments of the present disclosure may vary the dimensions of a micromachined resonator gyroscope, e.g. a disk resonator gyroscope (DRG), along the radial line of a resonator to engineer radial stiffness.

According to some exemplary embodiments of the present disclosure, an apparatus may comprise: a resonator having a plurality of concentric circumferential segments and a plurality of slots formed between the concentric circumferential segments; and at least one support supporting the resonator, wherein a width, in a radial direction, of each of the concentric circumferential segments may be varied depending on a distance from the at least one support to the each of the concentric circumferential segments. The apparatus may further comprise radial segments connecting between the concentric circumferential segments. The concentric circumferential segments may have a ring shape.

According to certain exemplary embodiments of the present disclosure, widths of the concentric circumferential segments may be decreased from a concentric circumferential segment adjacent to the at least one support in the radial direction. For example, widths of the concentric circumferential segments are linearly decreased from the at least one support in the radial direction. In another example, widths of the concentric circumferential segments may be logarithmically or exponentially decreased from a concentric circumferential segment adjacent to the at least one support in the radial direction.

According to some exemplary embodiments of the present disclosure, the at least one support may be disposed at a center of the resonator, and widths of the concentric circumferential segments may be decreased from an inner concentric circumferential segment to an outer concentric circumferential segment. For instance, a decremental rate of the widths of the concentric circumferential segments may be constant. In another example, a decremental rate of the widths of the concentric circumferential segments may be gradually decreased from the inner concentric circumferential segment to the outer concentric circumferential segment.

According to certain exemplary embodiments of the present disclosure, widths of the concentric circumferential segments may be increased from a concentric circumferential segment adjacent to the at least one support in the radial direction. For example, widths of the concentric circumferential segments are linearly increased from a concentric circumferential segment adjacent to the at least one support in the radial direction. In another example, widths of the concentric circumferential segments may be logarithmically or exponentially increased from a concentric circumferential segment adjacent to the at least one support in the radial direction.

According to some exemplary embodiments of the present disclosure, the at least one support may be disposed adjacent to an outer edge of the resonator, and widths of the concentric circumferential segments may be decreased or increased from the outer edge of the resonator toward an inward radial direction.

According to certain exemplary embodiments of the present disclosure, the at least one support may comprise: an inner support coupled to an inner concentric circumferential segment of the concentric circumferential segments; and an outer support coupled to an outer concentric circumferential segment of the concentric circumferential segments. The widths of the concentric circumferential segments may be decreased or increased from the inner and outer concentric circumferential segments to one of the concentric circumferential segments disposed between the inner concentric circumferential segment and the outer concentric circumferential segment or a middle between the inner and outer supports. The plurality of supports may reduce acceleration sensitivity.

According to some exemplary embodiments of the present disclosure, a width, in a radial direction, of each of the slots may be varied depending on a distance from the at least one support to the each of the slots.

According to some exemplary embodiments of the present disclosure, the width of each concentric circumferential segment of the resonator can be changed to improve Q-factor and gyroscope performance. Some exemplary embodiments of the present disclosure may reduce severe drop in stiffness of the resonator from the inner to outer edge of the resonator.

Furthermore, the resonator according to certain exemplary embodiments of the present disclosure can increase the average width of the concentric circumferential segments of the resonator to increase the stiffness of a respective concentric circumferential segment without high anchor loss, and be driven at a high frequency. In certain exemplary embodiments of the present disclosure, the increase in the stiffness of the resonator may not result in increasing anchor loss.

This Summary is provided to introduce a selection of concepts in a simplified form that are further described below in the Detailed Description. This summary is not intended to identify key features or essential features of the claimed subject matter, nor is it intended to be used to limit the scope of the claimed subject matter.

BRIEF DESCRIPTION OF THE DRAWINGS

Various embodiments in accordance with the present disclosure will be described with reference to the drawings, in which.

In these figures, reference numbers having the same last two digits are used to designate identical or similar elements.

Corresponding numerals and symbols in the different figures generally refer to corresponding parts unless otherwise indicated. The figures are drawn to clearly illustrate the relevant aspects of the embodiments and are not necessarily drawn to scale.

DETAILED DESCRIPTION OF EMBODIMENTS

In the following detailed description, reference is made to the accompanying drawings which form a part hereof, and in which are shown by way of illustration specific embodiments in which the invention may be practiced. These embodiments are described in sufficient detail to enable those skilled in the art to practice the invention, and it is to be understood that other embodiments may be utilized and that structural, logical and electrical changes may be made without departing from the spirit and scope of the invention. The following detailed description is therefore not to be taken in a limiting sense, and the scope of the invention is defined only by the appended claims and equivalents thereof. Like numbers in the figures refer to like components, which should be apparent from the context of use.

Figure 1A:
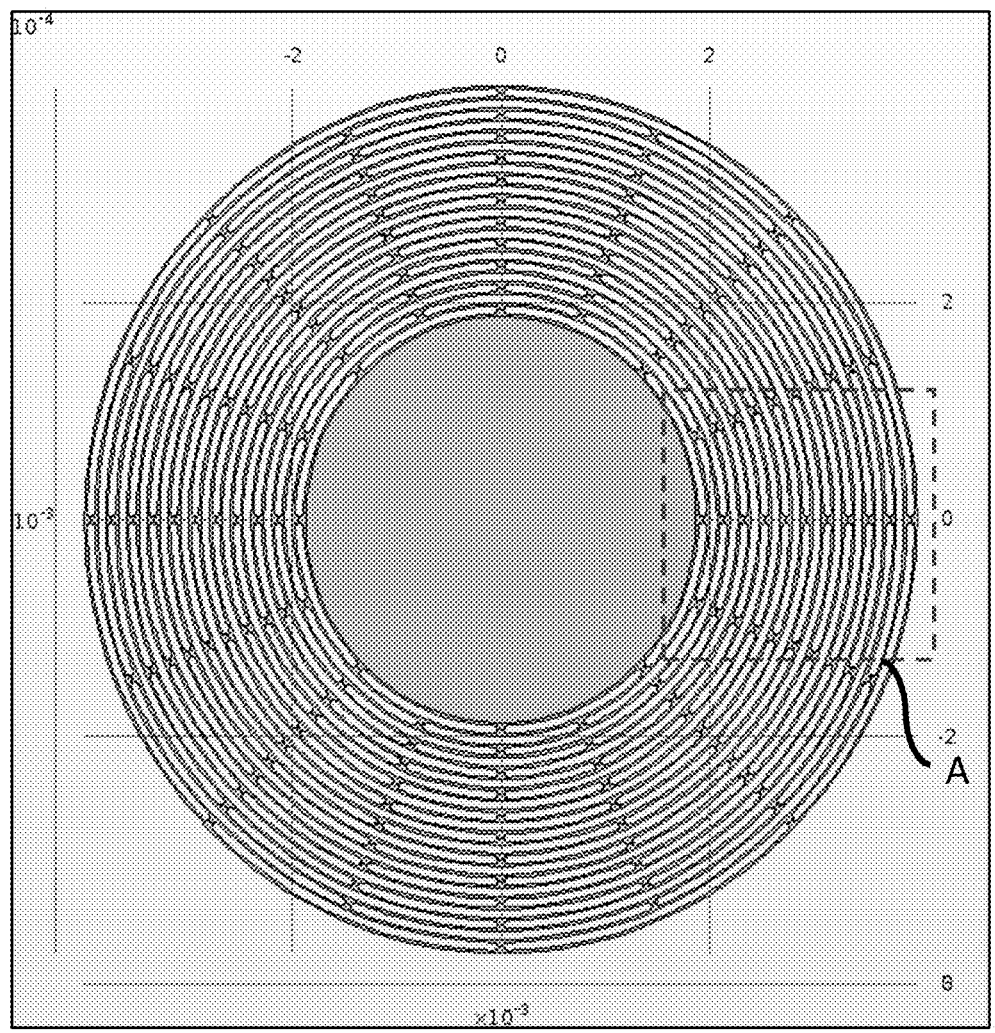
FIG. 1A shows a schematic top view of a conventional disk resonator gyroscope (DRG)
Figure 1B:
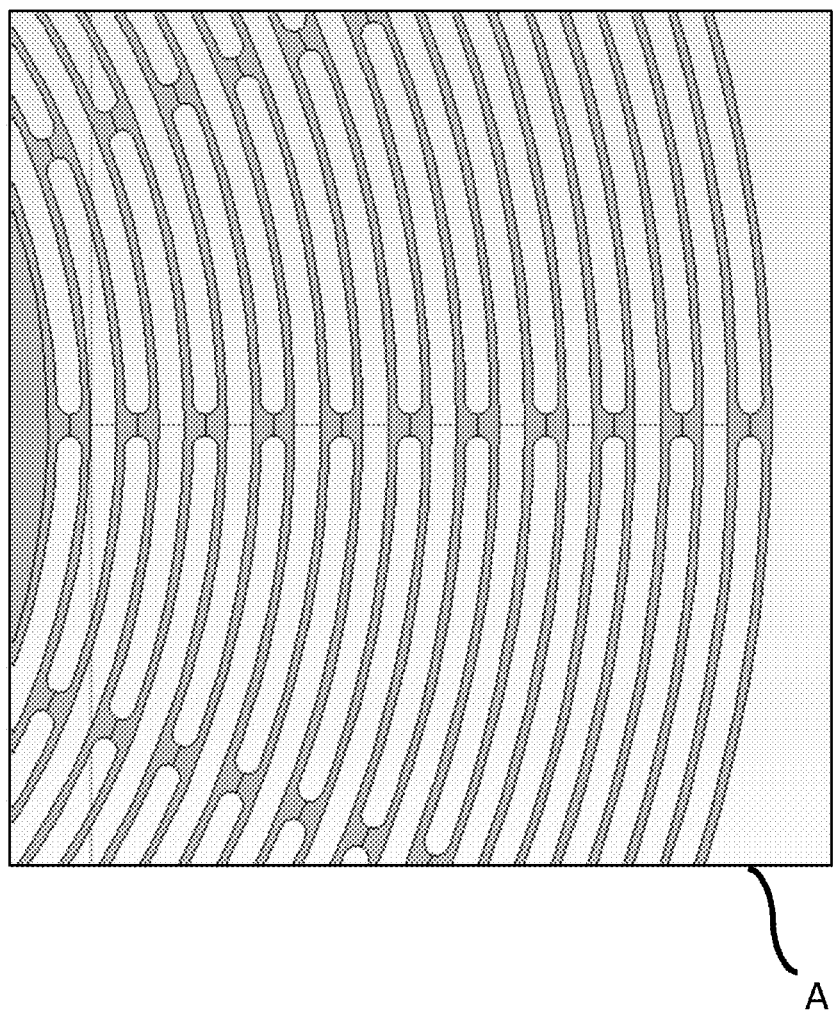
FIG. 1B shows an enlarged partial view of the conventional DRG.
Figure 1C:
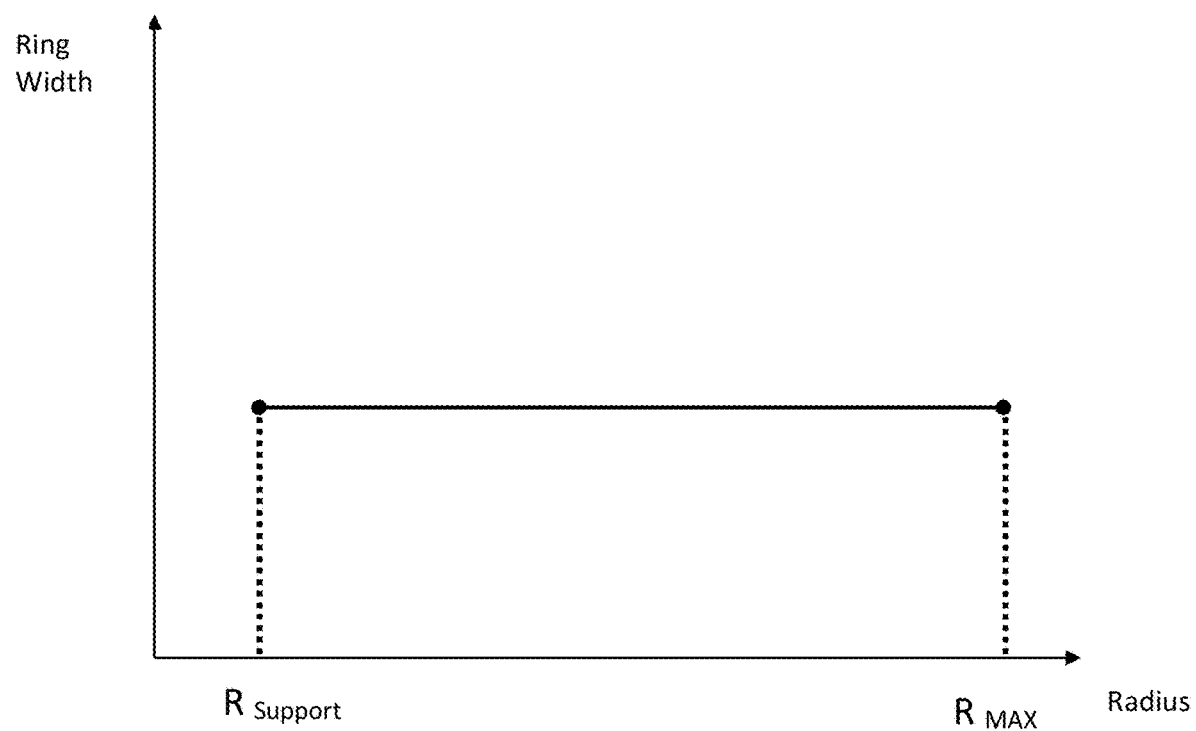
FIG. 1C shows a graph of ring widths with respect to radii of rings of the conventional DRG.
Figure 1D:
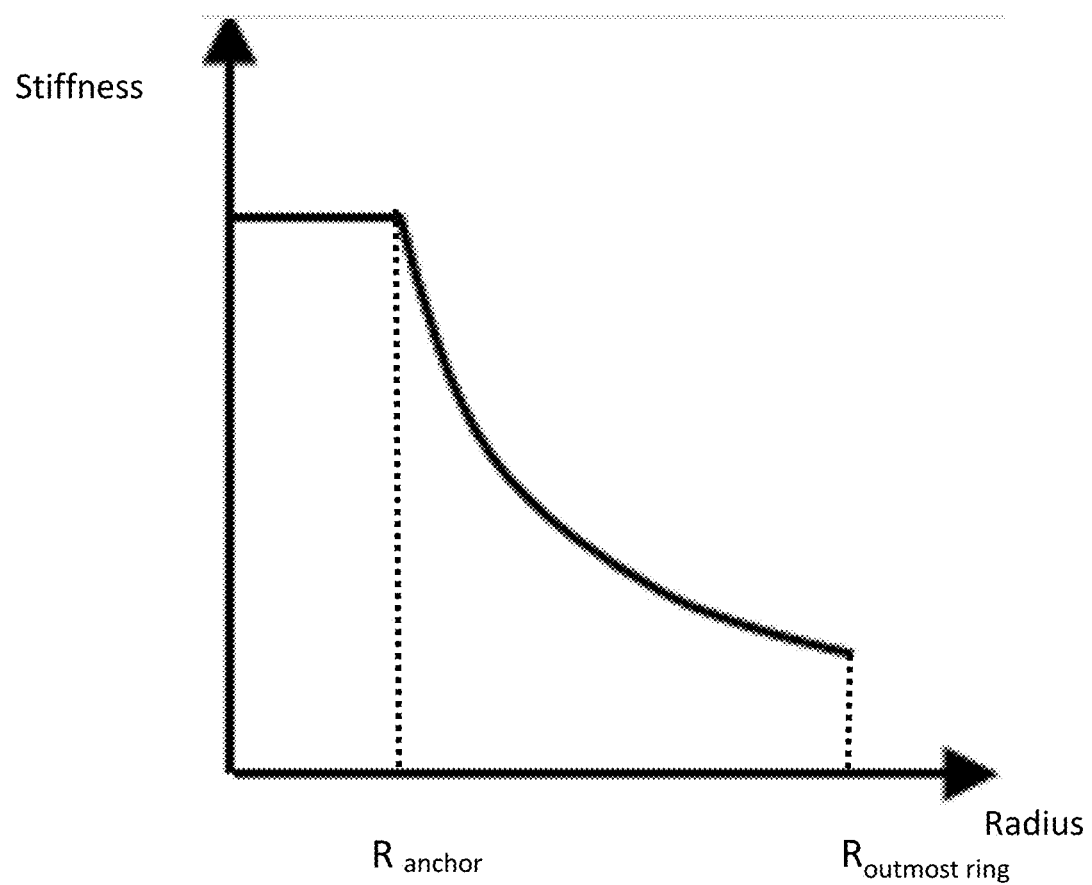
FIG. 1D shows stiffness profiles of a conventional DRG resonator supported by an inner support.
Figure 2A:
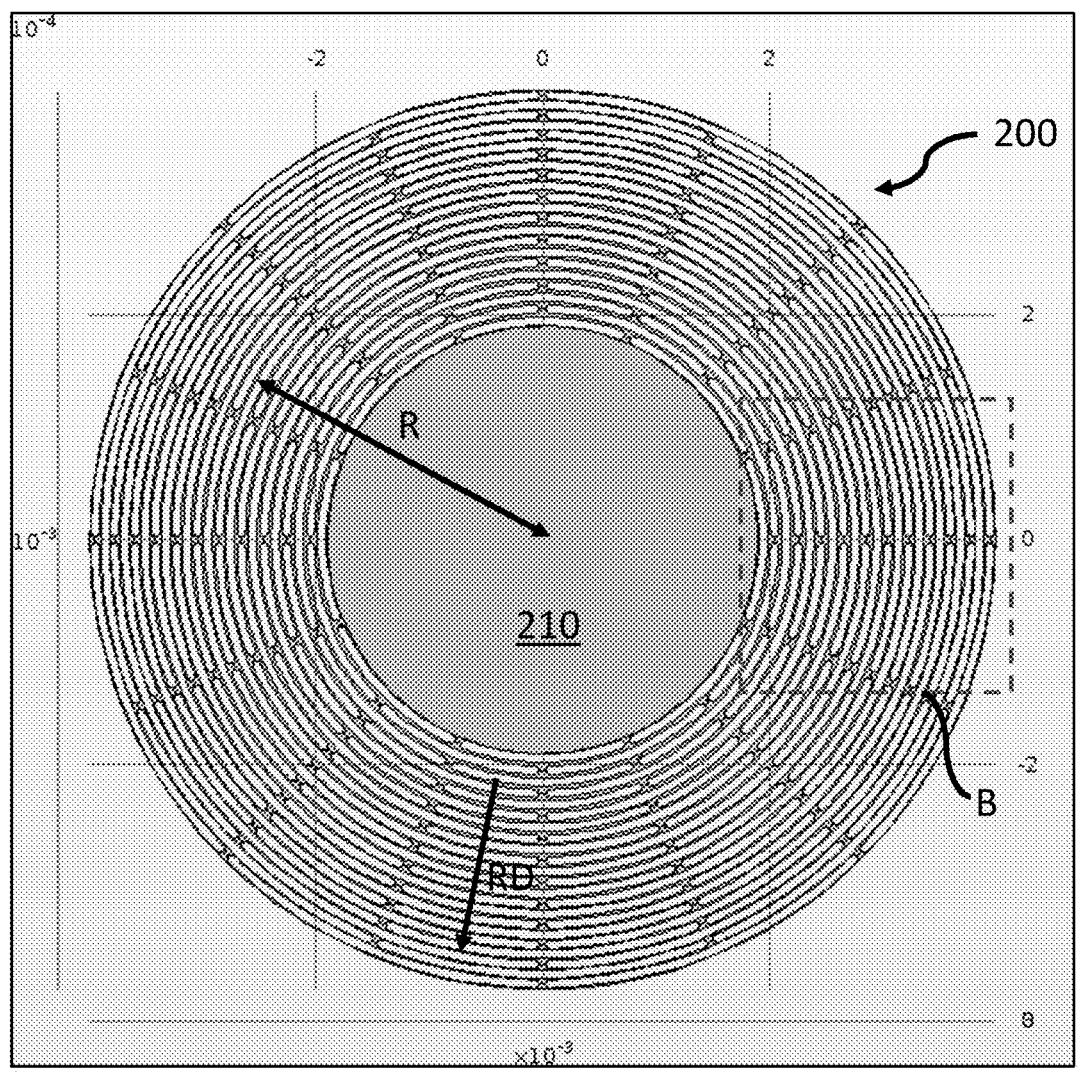
FIG. 2A shows a schematic top view of a resonator having concentric circumferential segments with linearly decreased widths according to an exemplary embodiment of the present disclosure.
Figure 2B:
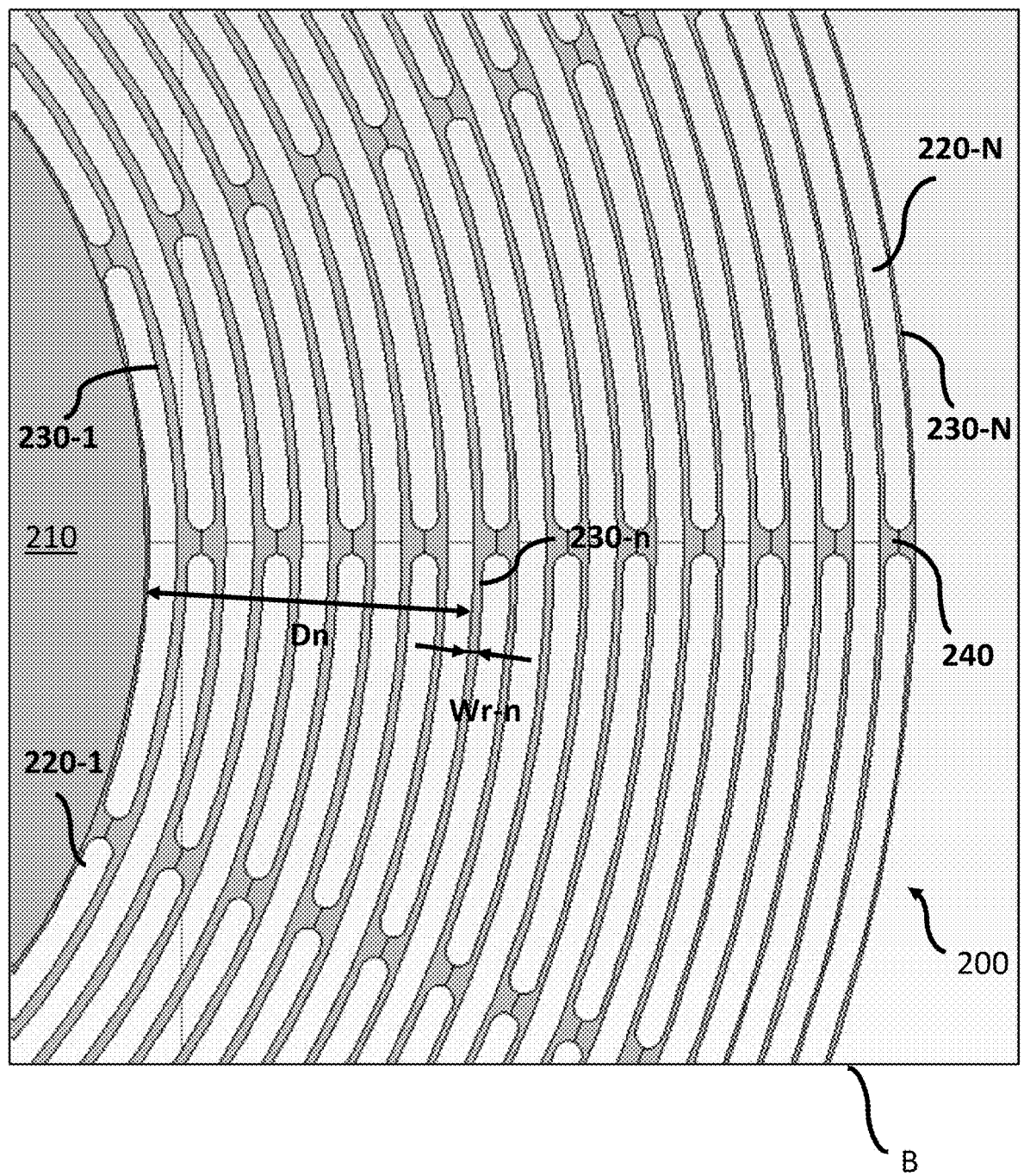
FIG. 2B shows an enlarged partial view of a resonator having concentric circumferential segments with linearly decreased widths according to an exemplary embodiment of the present disclosure.
Figure 2C:
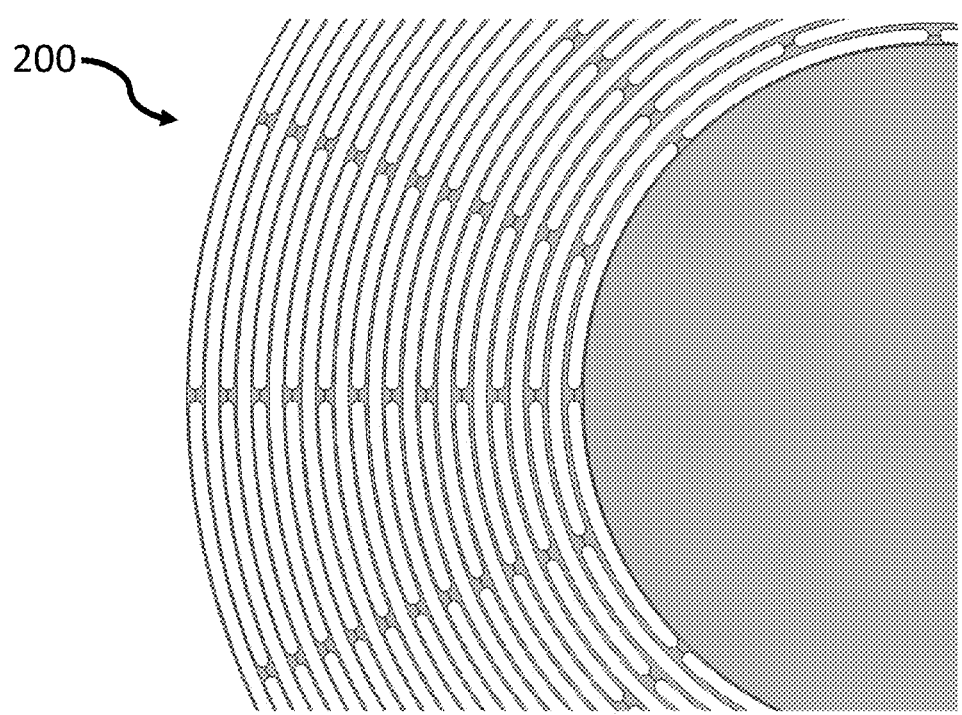
FIG. 2C shows another enlarged partial view of a resonator having concentric circumferential segments with linearly decreased widths according to an exemplary embodiment of the present disclosure.
Figure 2D:
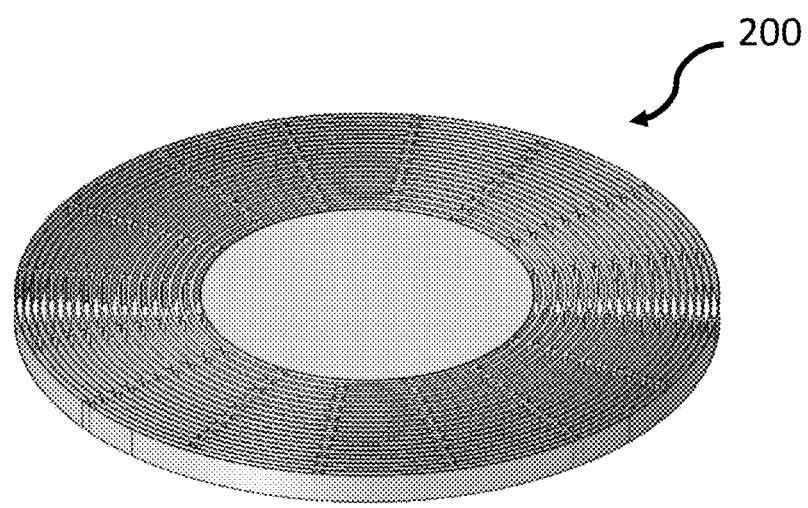
FIG. 2D shows a perspective view of a resonator having concentric circumferential segments with linearly decreased widths according to an exemplary embodiment of the present disclosure.
Figure 3A:
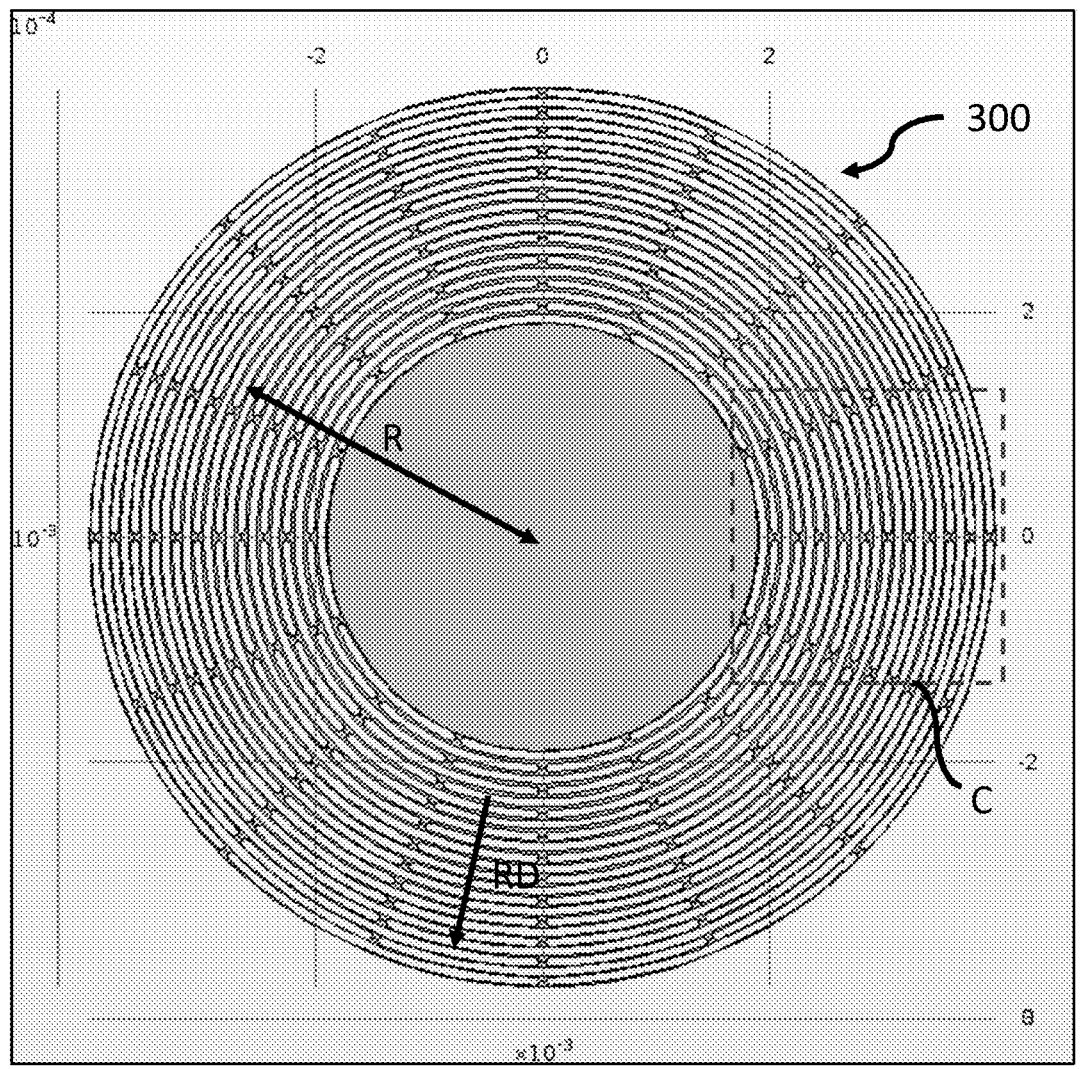
FIG. 3A shows a schematic top view of a resonator having concentric circumferential segments with logarithmically decreased widths according to an exemplary embodiment of the present disclosure.
Figure 3B:
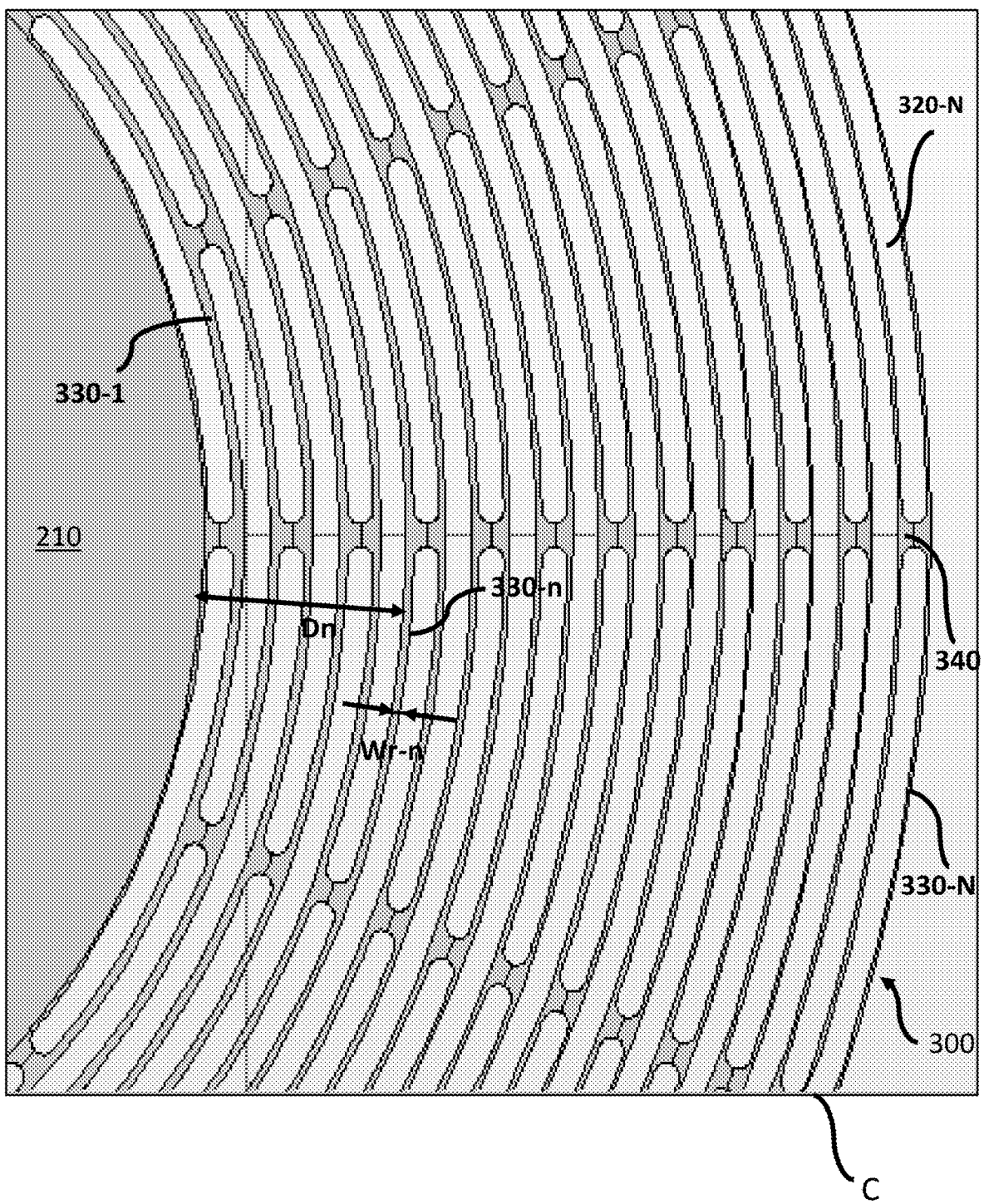
FIG. 3B shows an enlarged partial view of a resonator having concentric circumferential segments with logarithmically decreased widths according to an exemplary embodiment of the present disclosure.

FIGS. 2A and 3A show schematic top views of a resonator for a gyroscope or inertial sensor according to exemplary embodiments of the present disclosure. FIGS. 2B and 3B show enlarged partial views of a resonator for a gyroscope or inertial sensor according to exemplary embodiments of the present disclosure.

The gyroscope or inertial sensor may comprise a planar resonator 200. The resonator 200 may be supported by a rigid central support or anchor 210 and designed for in-plane vibration. The resonator 200 may comprise a disk that includes a plurality of slots, e.g. 220-1 to 220-N (generally referenced as 220) formed between a plurality of concentric circumferential segments 230-1 to 230-N (generally referenced as 230). The circumferential resonator segments 230 may be formed as a plurality resonator rings that may be concentrically formed outward from the central support 210. Although FIGS. 2A and 2B illustrate the concentric circumferential segments 230 as having ring shapes, the concentric circumferential segments 230 may be formed as oval, polygonal, square, diamond, or any appropriate shapes. The slots 220 may be formed between the concentric circumferential segments 230. The circumferential segments 230 may be interconnected and supported by radial segments 240, such as spokes. According to an embodiment of the disclosure, any two radial segments connecting three segments 230 forming two consecutive pairs of segments are radially offset by an angle. The resonator 200, slots 220, circumferential segments 230, and radial segments 240 may be fabricated from a single wafer of material, for example, but not limited to, silicon and fused quartz.

The widths, in a radial direction RD, of the concentric circumferential segments 230 may be varied. Each of the concentric circumferential segments 230 may have various widths. The width Wr-n of each concentric circumferential segment 230-n may be changed depending on, for example, but not limited to, a distance Dn (of an inner wall of segment 230-n) from the support 210 to each concentric circumferential segment 230-n. For example, the widths Wr of the concentric circumferential segments 230 may be varied linearly, exponentially or logarithmically. In another example, the resonator 200 may have a sinusoidally varying width profile where the widths of the concentric circumferential segments 230 alternate between wide and narrow.

In some embodiments, the widths Wr of the concentric circumferential segments 230 may be decreased from the central support 210 toward the outward radial direction RD, for example, from the inmost segment 230-1 to the outmost segment 230-N. For example, the concentric circumferential segment 230-1 that is positioned closest to the central support 210 can have the widest width among the concentric circumferential segments 230, and the concentric circumferential segment 230-N that is located at the outer edge of the resonator 200 can have the narrowest width among the concentric circumferential segments 230. The farther the distance Dn from the support 210 to the concentric circumferential segment 230-n, the narrower the width Wr-n of the concentric circumferential segment 230-n. The widths of the concentric circumferential segments 230 can be decreased linearly, exponentially, or logarithmically.

Figure 2E:
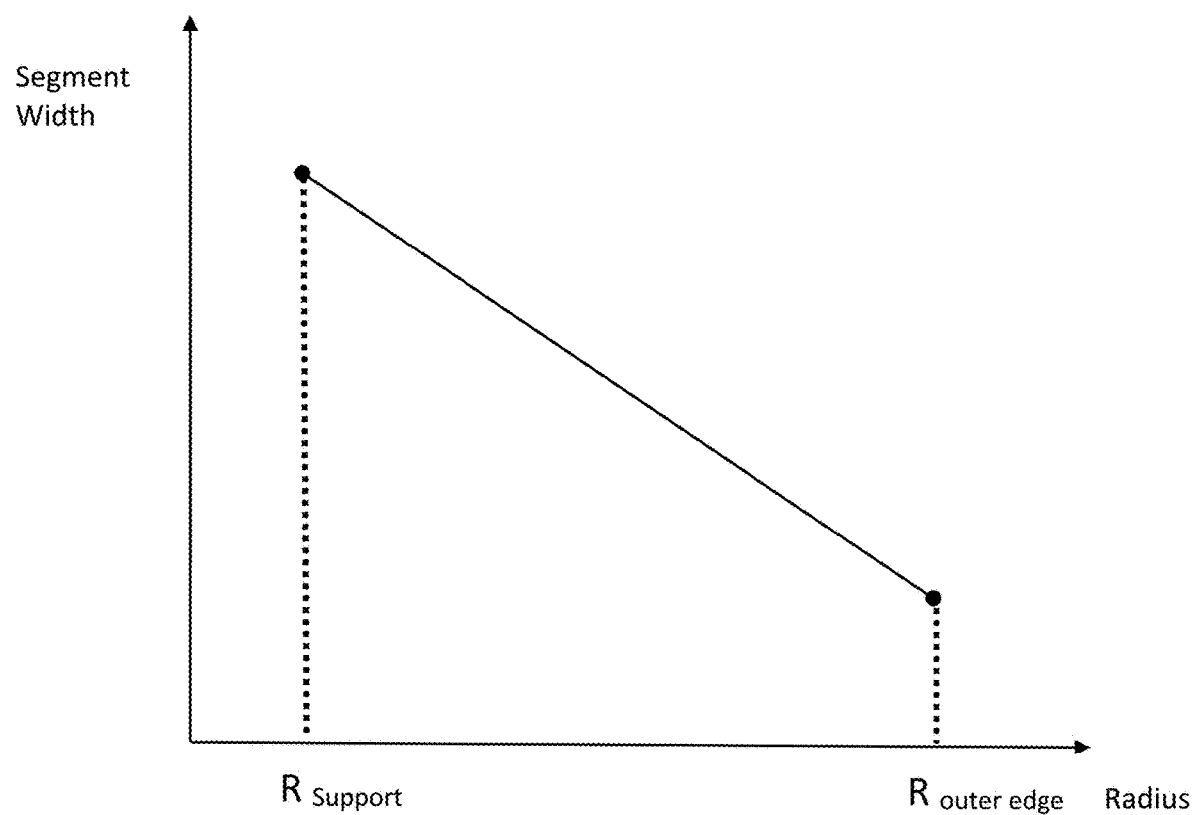
FIG. 2E shows a graph of concentric circumferential segment widths with respect to radii of concentric circumferential segments of a resonator having concentric circumferential segments with linearly decreased widths according to an exemplary embodiment of the present disclosure.

In some embodiments, the decremental rate of the widths of the concentric circumferential segments 230 may be constant. For instance, FIGS. 2A-2E show exemplary embodiments where the widths Wr of the concentric circumferential segments 230 are decreased linearly. The widths of the concentric circumferential segments 230 may be decreased by constant decrement from the inmost segment 230-1 to the outmost segment 230-N. As shown in FIG. 2E, the widths of the concentric circumferential segments 230 can be decreased constantly.

Figure 3C:
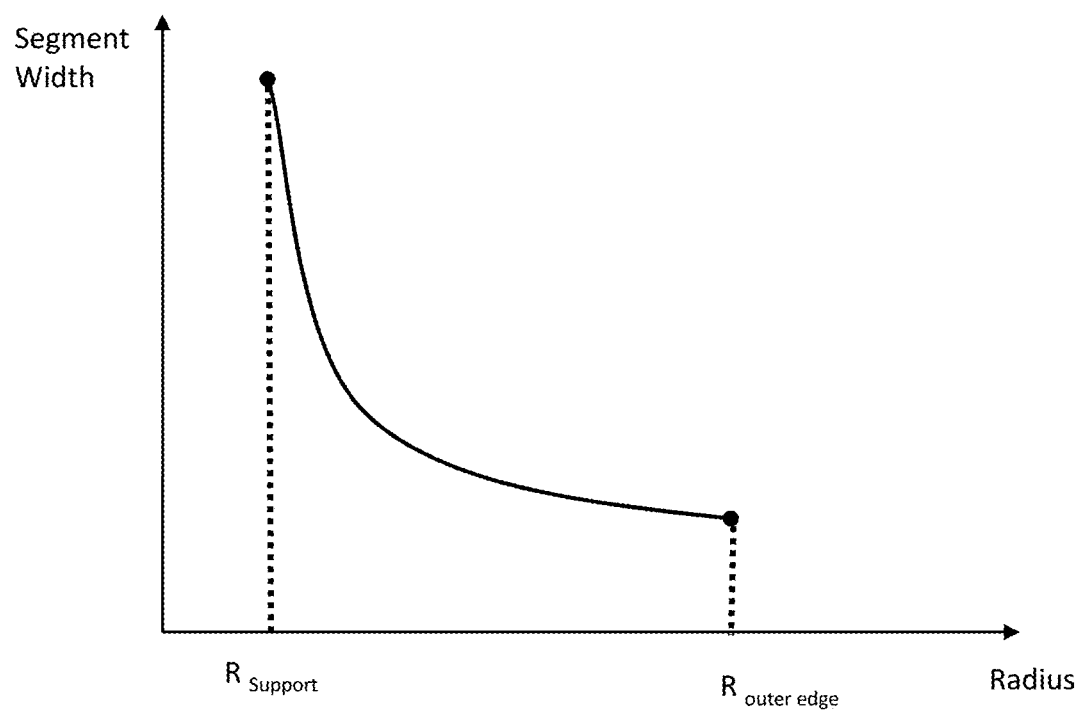
FIG. 3C shows a graph of concentric circumferential segment widths with respect to radii of concentric circumferential segments of a resonator having concentric circumferential segments with logarithmically decreased widths according to an exemplary embodiment of the present disclosure.

In other embodiments, the decremental rate of the widths of the concentric circumferential segments of the resonator may be gradually decreased from the central support to the outer edge of the resonator. For example, FIGS. 3A-3C show an exemplary embodiment where the widths of the concentric circumferential segments of the resonator are decreased logarithmically. In FIGS. 3A and 3B, reference numbers having the same last two digits as FIGS. 2A and 2B are used to designate identical or similar elements except the widths of concentric circumferential segments. The resonator 300 is similar to that described with respect to the resonator 200 of FIGS. 2A and 2B. All of the same elements (for example, support 210, slots 220, concentric circumferential segments 230, and radial segments 240) are employed in the resonator 300, but the widths of the concentric circumferential segments 330 of FIGS. 3A and 3B are decreased logarithmically while the widths of the concentric circumferential segments 230 of FIGS. 2A and 2B are decreased linearly. As shown in FIG. 3C, the widths of the concentric circumferential segments 330 of the resonator 300 positioned near the central support 210 may be sharply decreased from the support 210 while the widths of the concentric circumferential segments 330 positioned near the outer edge of the resonator 300 may be evenly decreased toward the outer edge of the resonator 300. Accordingly, the widths of the concentric circumferential segments 330 disposed at the inner portion of the resonator 300 may be significantly different from the widths of the concentric circumferential segments 330 disposed at other portions of the resonator 300. However, the widths of the concentric circumferential segments 330 that are disposed at the outer portion of the resonator 300 or near the outer edge of the resonator 300 may have narrow widths with small difference or have the substantially same or similar widths.

In other exemplary embodiments of the present disclosure, the widths of all concentric circumferential segments 230 or 330 may not be necessarily different from each other. Some concentric circumferential segments 230 or 330 positioned next to or near each other may have the same or substantially identical widths.

Furthermore, the widths, in a radial direction RD, of the slots 220 or 320 may be also varied. The slots 220 or 320 formed between the concentric circumferential segments 230 or 330 may have various widths. For example, the width of each slot 220 may be changed depending on a distance from the support 210 to each slot 220 or 320. For example, the widths of the slots 220 or 320 may be varied (e.g. increased or decreased) linearly, exponentially or logarithmically. In another example, the resonator 200 or 300 may have a sinusoidally varying width profile where the widths of the slots 220 or 320 alternate between wide and narrow.

Certain exemplary embodiments of the present disclosure may prevent steep drop in stiffness from the inner edge of the resonators 200 and 300 to the middle portion of the resonators 200 and 300. The resonators 200 and 300 having variable widths of concentric circumferential segments 230 may have better gyro performance than the conventional disk resonator gyroscopes having uniform ring and slot widths in terms of anchor loss and stiffness profile.

Figure 4:
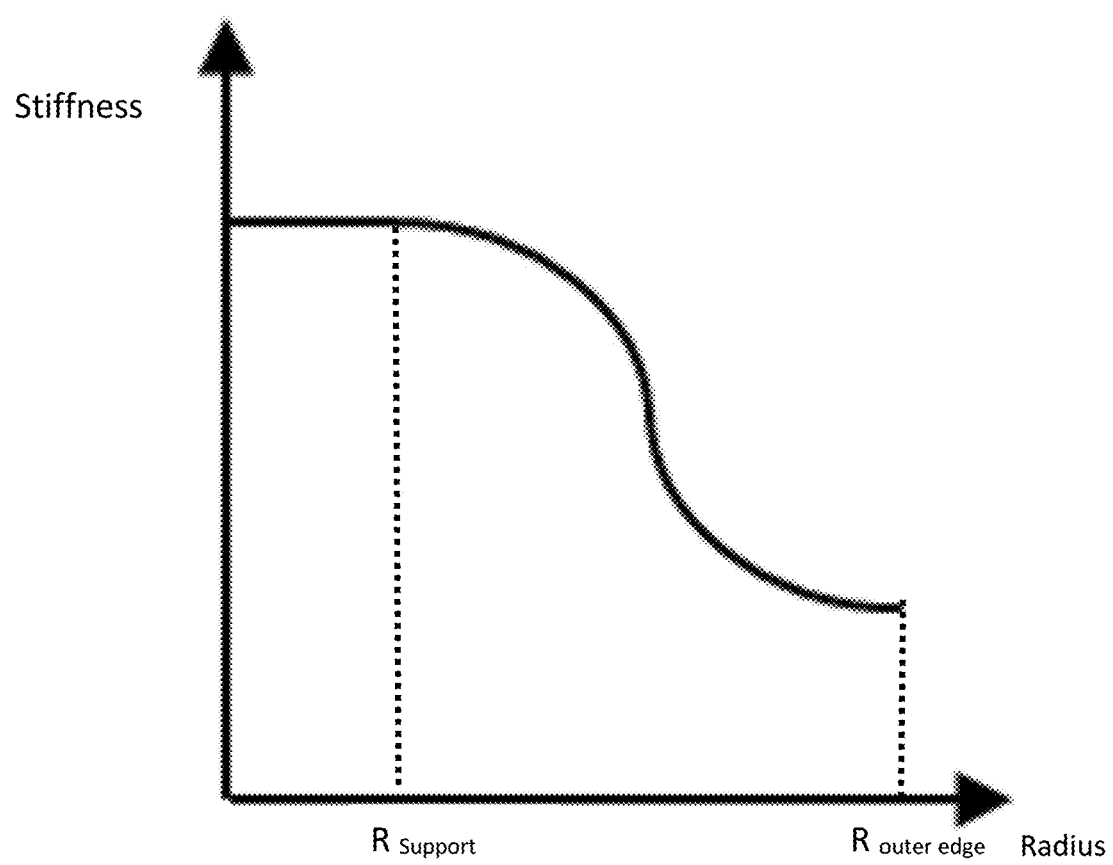
FIG. 4 shows a graph of stiffness with respect to radii of concentric circumferential segments of a resonator according to exemplary embodiments of the present disclosure.

As shown in FIG. 4, by variably decreasing the widths of the concentric circumferential segments of the resonator toward an outward radial direction, the drastic drop in the stiffness from the central anchor to the middle portion of the resonator can be prevented or diminished.

Figure 5:
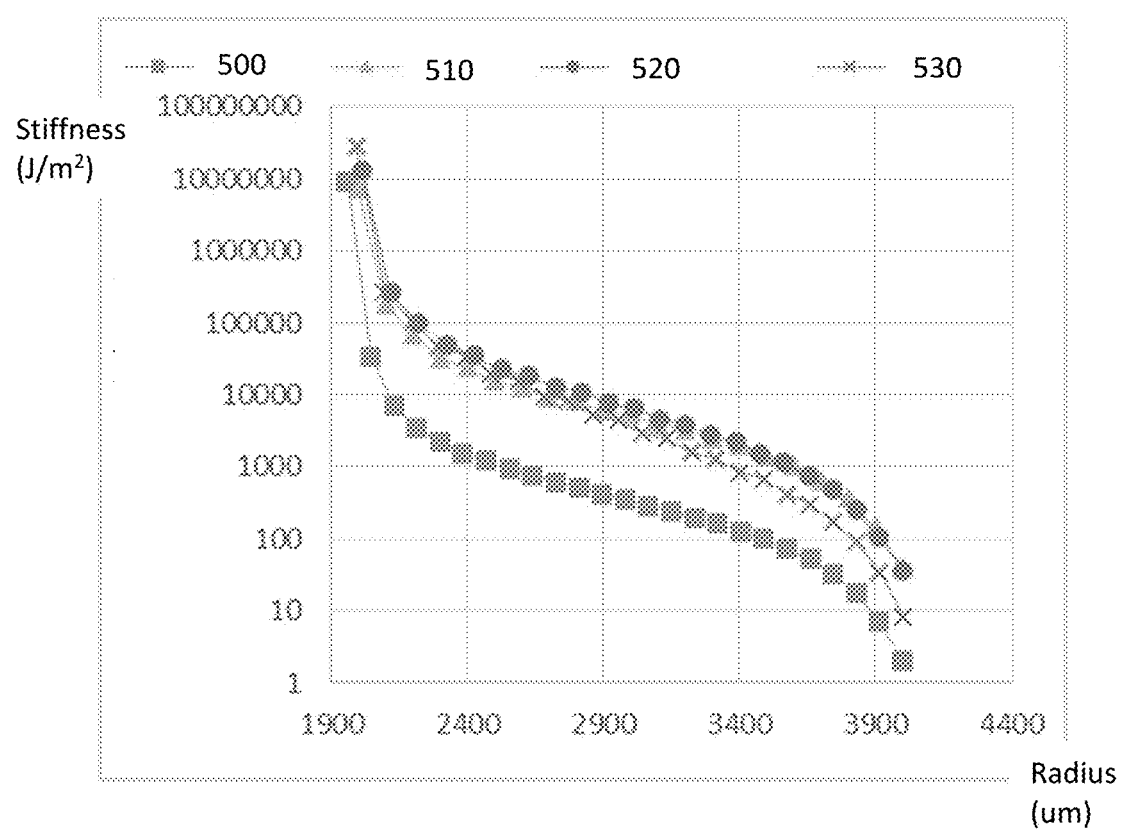
FIG. 5 shows a graph of stiffness of several resonators with respect to a radius for each concentric circumferential segment.

FIG. 5 shows a graph of stiffness of several resonators with respect to a radius for each concentric circumferential segment. A line 500 illustrates the stiffness of a uniform width type resonator having a 10 um uniform ring, a line 510 illustrates the stiffness of another uniform width type resonator having a 25 um uniform ring, a line 520 illustrates the stiffness of a linear variable width type resonator (e.g. the resonator 200 of FIGS. 2A and 2B), and a line 530 illustrates the stiffness of a logarithmic variable width type resonator (e.g. the resonator 300 of FIGS. 3A and 3B). The lines 520 and 530 show that the linear and logarithmic variable width type resonators have high stiffness.

Figure 6:
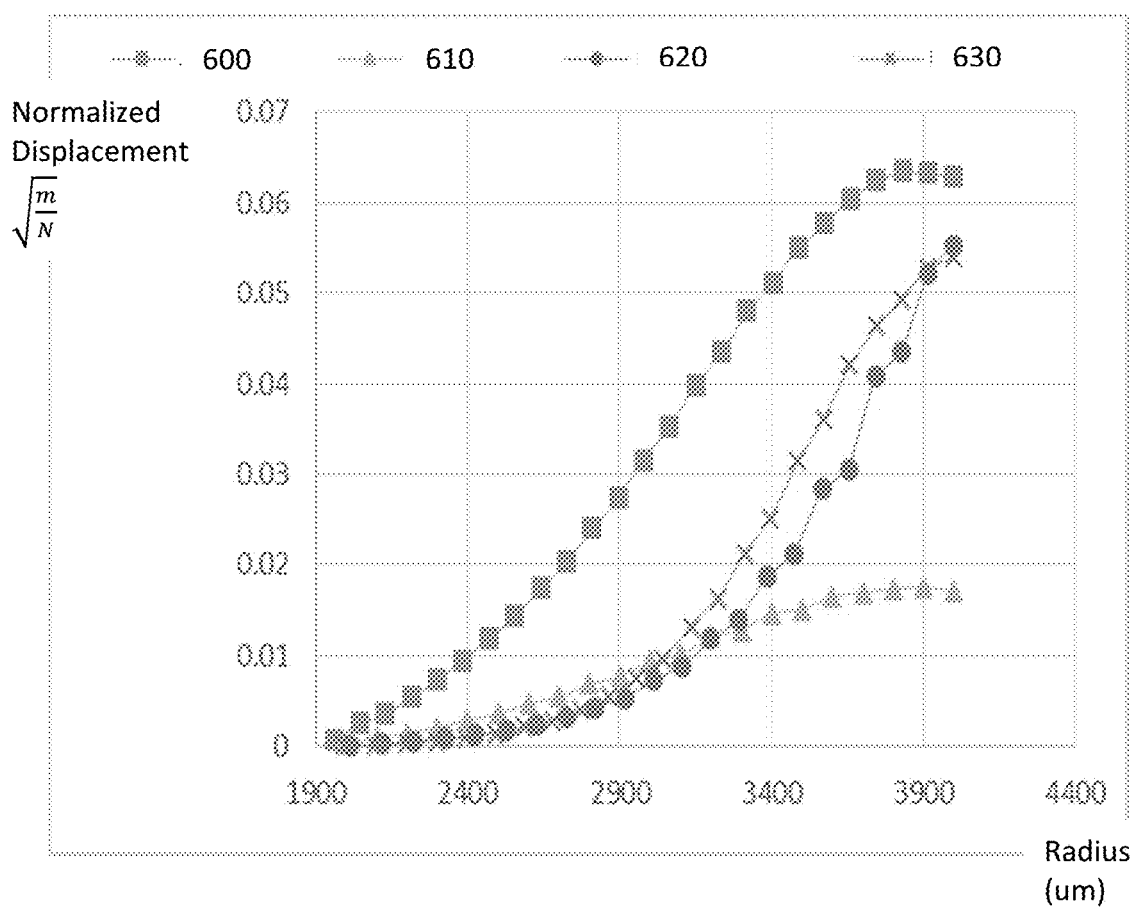
FIG. 6 is a graph of normalized displacement of concentric circumferential segments of several resonators with respect to radii of each concentric circumferential segment.

FIG. 6 is a graph of normalized displacement of concentric circumferential segments of several resonators with respect to radii of each concentric circumferential segment. In FIG. 6, the displacement normalized by the stored energy of each concentric circumferential segment is plotted at each concentric circumferential segment. The displacement is normalized by measuring maximum displacement of each concentric circumferential segment and dividing it by the volume integral of the stored energy of each concentric circumferential segment. A line 600 illustrates the normalized displacement of a uniform width type resonator having a 10 um uniform ring, a line 610 illustrates the normalized displacement of another uniform width type resonator having a 25 um uniform ring, a line 620 illustrates the normalized displacement of a linear variable width type resonator (e.g. the resonator 200 of FIGS. 2A and 2B), and a line 630 illustrates the normalized displacement of a logarithmic variable width type resonator (e.g. the resonator 300 of FIGS. 3A and 3B). As illustrated in FIG. 6, the line 600 shows that the uniform width type resonator with the 10 um uniform ring has large motion near the anchor or support and therefore significant anchor loss can occur, and the line 610 shows that the uniform width type resonator with the 25 um uniform ring has small changes in the displacement. However, the lines 620 and 630 show that the linear and logarithmic variable width type resonators have substantially flat and small displacement near the anchor or support, and maintain maximum displacement near the outer edge of the resonator. Hence, most resonator motion is away from the anchor or support, and this may reduce energy loss from resonator rings to anchor or support, resulting high anchor Q-factor.

Figure 7:
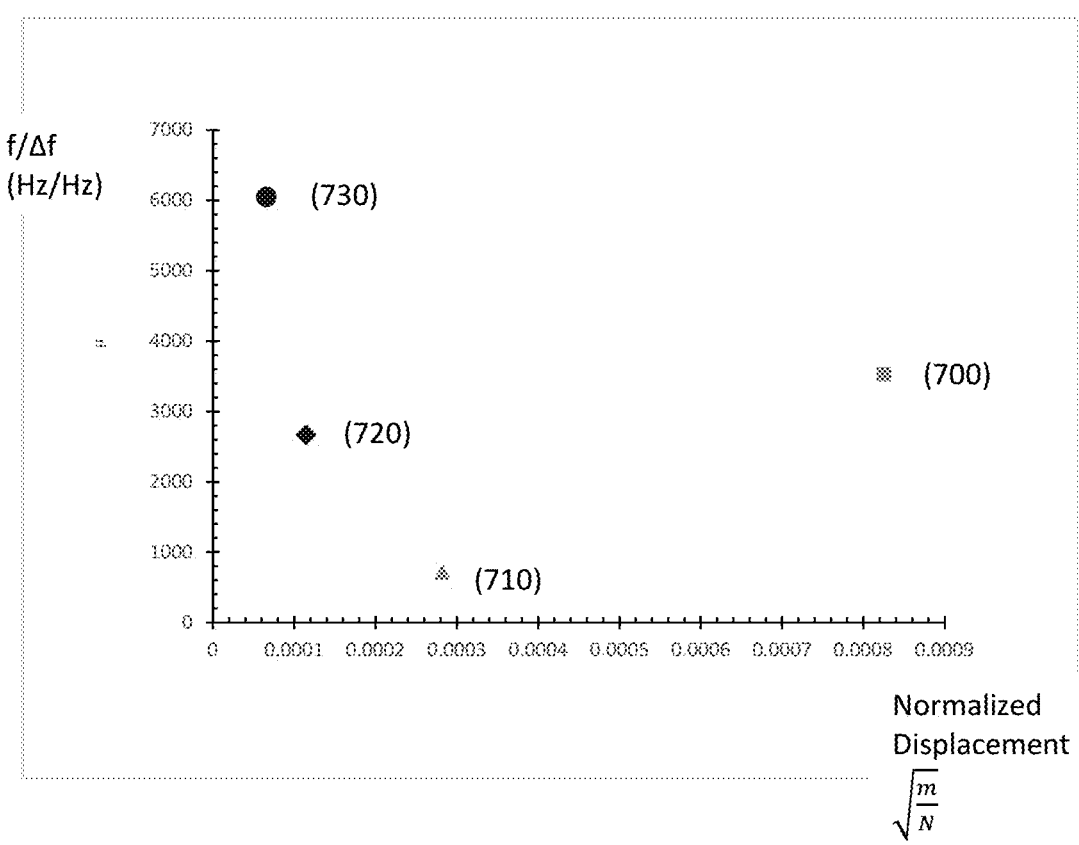
FIG. 7 is a graph of f/Δf versus normalized displacement of concentric circumferential segments of several resonators.

FIG. 7 is a graph of $f/\Delta f$ versus normalized displacement of concentric circumferential segments of several resonators. f represents the resonance frequency and $\Delta f$ is the frequency change due to the anchor stiffness. Higher $f/\Delta f$ may mean that the resonator rings may be less affected by stiffness change of the anchor. Detailed explanation of $f/\Delta f$ can be found in Sorenson, Logan & Ayazi, Farrokh. (2014). "Effect of structural anisotropy on anchor loss mismatch and predicted case drift in future micro-Hemispherical Resonator Gyros. Record"—IEEE PLANS, Position Location and Navigation Symposium. 493-498. 10.1109/PLANS 0.2014.6851408, which is hereby incorporated by reference in its entirety. The values on the horizontal axis of FIG. 7 are the normalized displacements of the inmost concentric circumferential segment positioned at the inner edge of the resonator. These show the amount of displacement per unit of energy. Higher stiffness in concentric circumferential segments may cause less displacement. As the width of the concentric circumferential segment of the resonator increases from a uniform width type resonator 700 having a 10 um uniform segment width to another uniform width type resonator 710 having a 25 um uniform segment width, the stiffness is increased but the Q-factor is decreased. However, both a linear variable width type resonator 720 (e.g. the resonator 200 of FIGS. 2A and 2B) and a logarithmic variable width type resonator 730 (e.g. the resonator 300 of FIGS. 3A and 3B) show that $f/\Delta f$ can be increased without adding the displacement of the inner concentric circumferential segments.

As described above, FIGS. 2A, 2B, 3A and 3B show exemplary embodiments of the resonators 200 and 300 where the widths of concentric circumferential segments 230 and 330 are decreased from the support 210 to the outer edge of the resonators 200 and 300. In contrast, FIGS. 8 and 9 illustrate exemplary embodiments of resonators 800 and 900 where the widths of concentric circumferential segments 830 and 930 are increased from the central support or anchor 210 to the outer edge of the resonators 800 and 900. In FIGS. 8 and 9, reference numbers having the same last two digits as FIGS. 2A and 2B are used to designate identical or similar elements except the widths of concentric circumferential segments. FIGS. 8 and 9 show schematic top views and enlarged partial views of resonators for a gyroscope or inertial sensor according to exemplary embodiments of the present disclosure. Resonators 800 and 900 of FIGS. 8 and 9 are similar to those described with respect to the resonator 200 of FIGS. 2A, 2B, 3A and 3B. All of the same elements (for example, support 210, slots 220 and 320, concentric circumferential segments 230 and 330, and radial segments 240 and 340) are employed in the resonators 800 and 900, but the widths of the concentric circumferential segments 830 and 930 are increased from the inmost concentric circumferential to the outmost concentric circumferential.

In FIGS. 8 and 9, the widths of the concentric circumferential segments 830 and 930 may be increased from the central support 210 toward the outward radial direction RD, for example, from the inmost segment 830-1 or 930-1 to the outmost segment 830-N or 930-N. For example, the concentric circumferential segment 830-1 or 930-1 that is positioned closest to the central support 210 can have the narrowest width among the concentric circumferential segments 830 or 930, and the concentric circumferential segment 830-N or 930-N that is located at the outer edge of the resonator 800 or 900 can have the widest width among the concentric circumferential segments 830 or 930. The farther the distance Dn from the support 210 to the concentric circumferential segment 830-n or 930-n, the wider the width Wr-n of the concentric circumferential segment 830-n or 930-n. For example, the widths of the concentric circumferential segments 230 can be increased linearly, exponentially, or logarithmically.

Figure 8A:
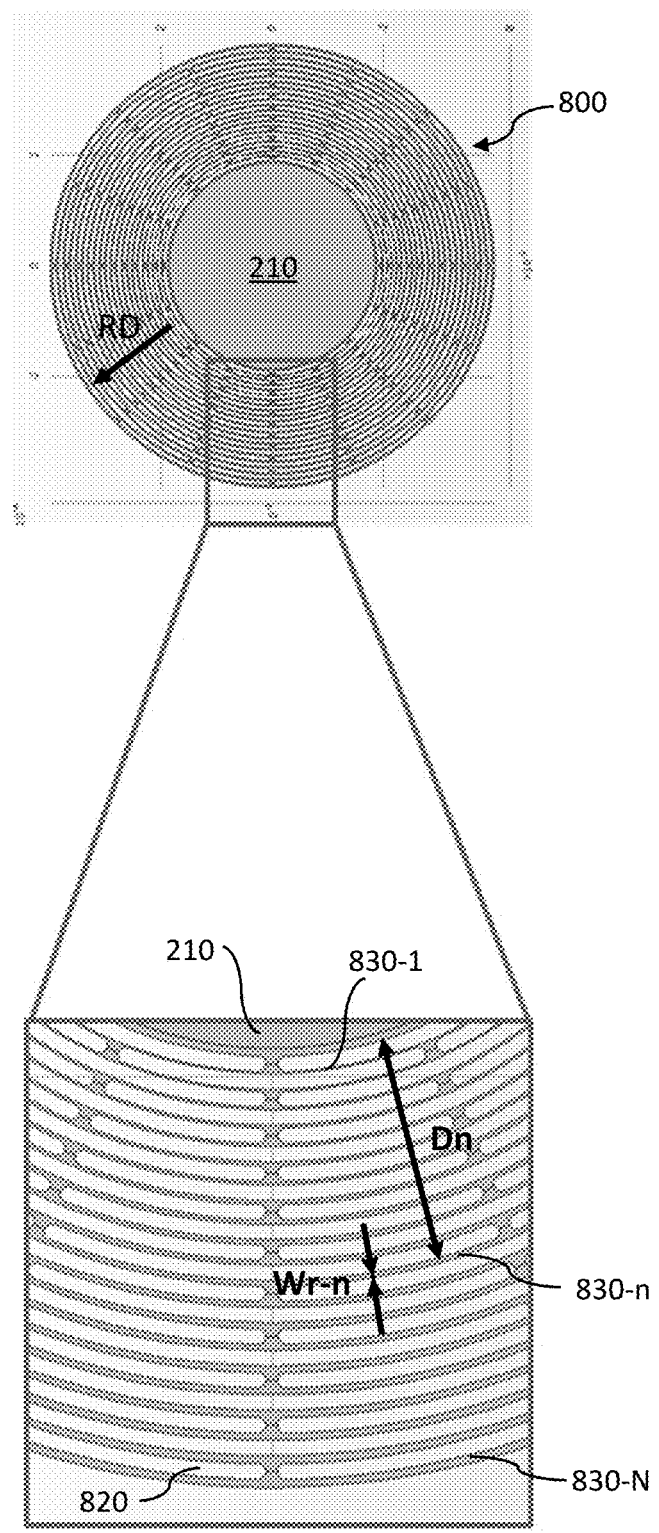
FIG. 8A shows a schematic top view and enlarged partial view of a resonator having concentric circumferential segments with linearly increased widths according to exemplary embodiments of the present disclosure.
Figure 8B:
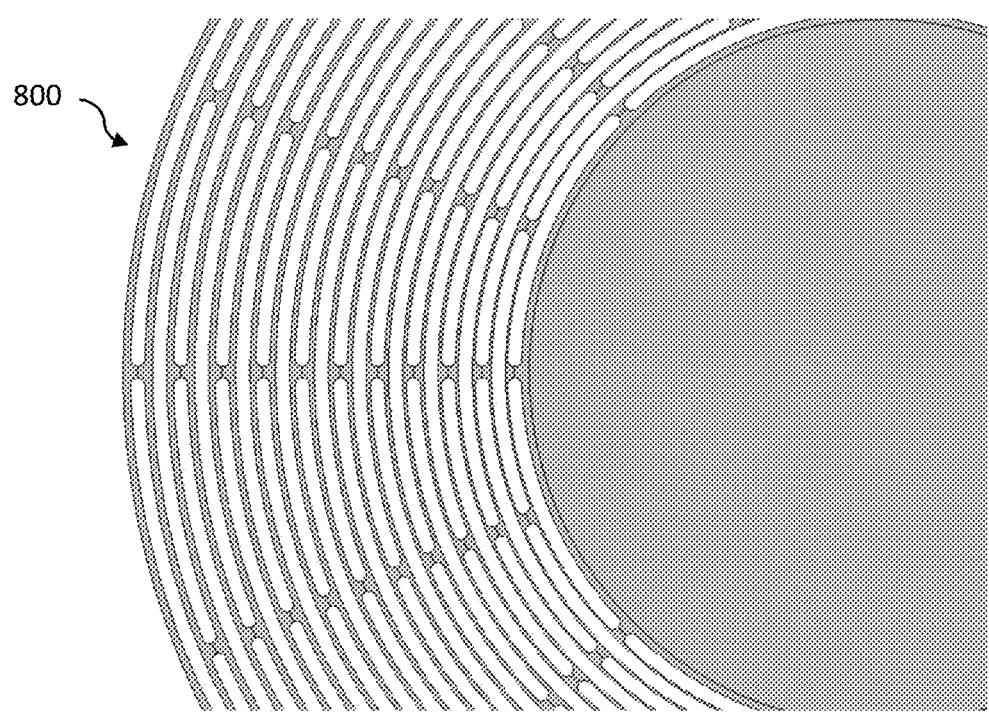
FIG. 8B shows another enlarged partial view of a resonator having concentric circumferential segments with linearly increased widths according to exemplary embodiments of the present disclosure.
Figure 8C:
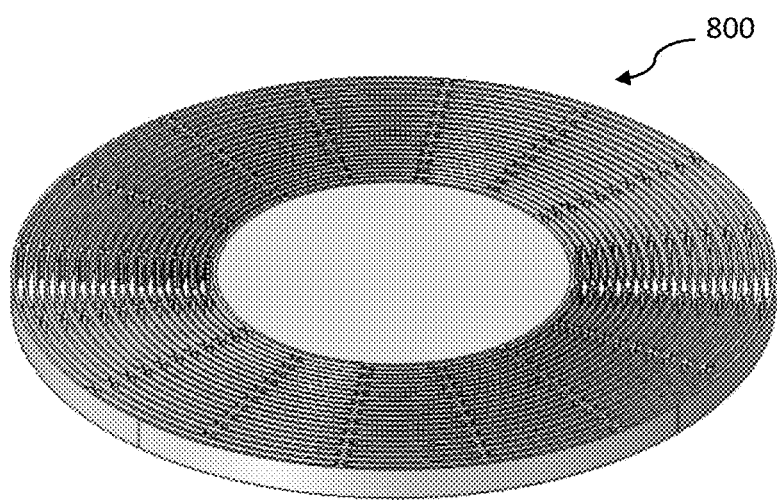
FIG. 8C shows a perspective view of a resonator having concentric circumferential segments with linearly increased widths according to exemplary embodiments of the present disclosure.
Figure 9:
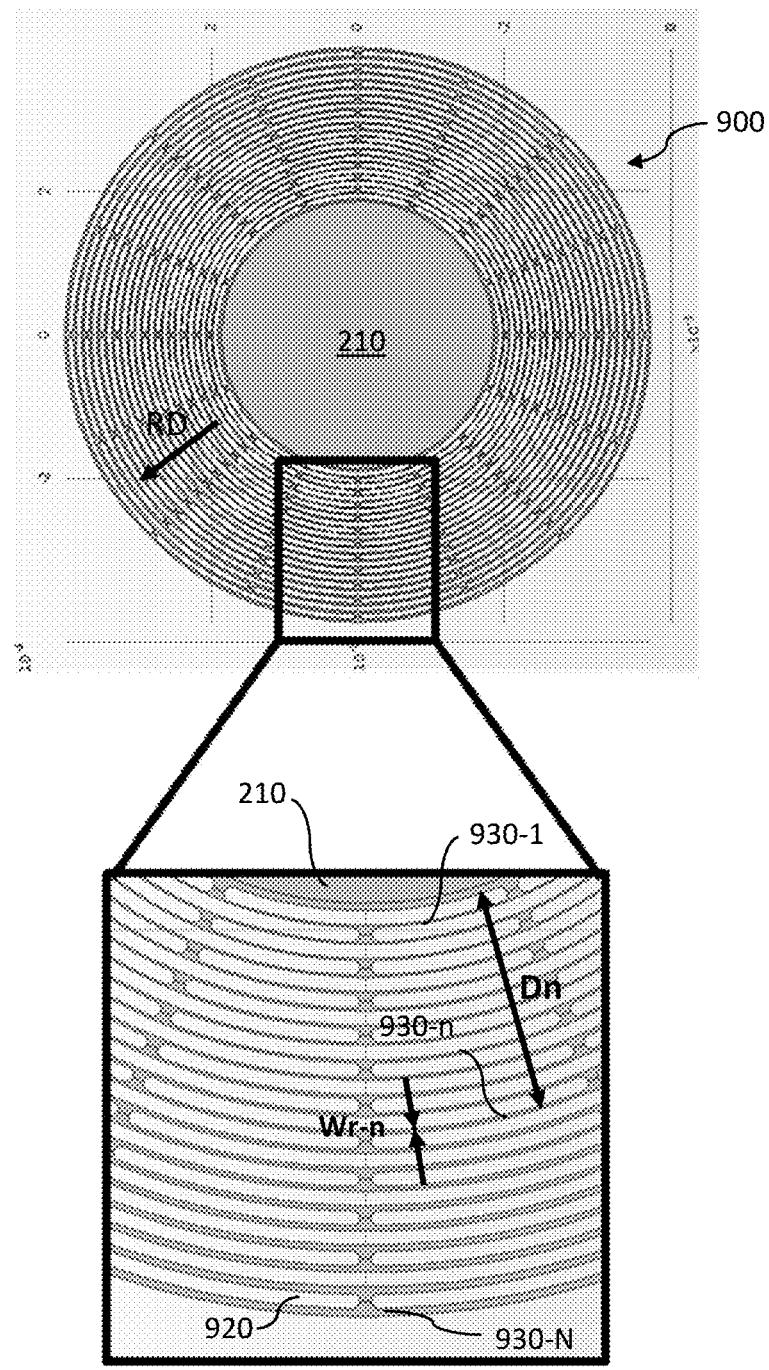
FIG. 9 shows a schematic top view and enlarged partial view of a resonator having concentric circumferential segments with logarithmically increased widths according to exemplary embodiments of the present disclosure.

In one exemplary embodiment shown in FIGS. 8A-8C, the incremental rate of the widths of the concentric circumferential segments 830 may be constant. The widths Wr-n of the concentric circumferential segments 830 are increased linearly. The widths of the concentric circumferential segments 830 may be increased by constant increment from the inmost segment 830-1 to the outmost segment 830-N.

In another embodiment shown in FIG. 9, the incremental rate of the widths of the concentric circumferential segments 930 may be gradually decreased or increased from the central support 210 to the outer edge of the resonator 900. For example, the widths Wr-n of the concentric circumferential segments 930 are increased exponentially or logarithmically toward the outward radial direction RD. The widths of the concentric circumferential segments 930 positioned near the central support 210 may be sharply increased from the support 210 while the widths of the concentric circumferential segments 930 positioned near the outer edge of the resonator 900 may be evenly increased toward the outer edge of the resonator 900. Accordingly, the widths of the concentric circumferential segments 930 disposed at the inner portion of the resonator 900 may be significantly different from each other. However, the widths of the concentric circumferential segments 930 that are disposed at the outer portion of the resonator 900 or near the outer edge of the resonator 900 may have wide widths with small difference or have the substantially same or similar widths.

In other exemplary embodiments of the present disclosure, the widths of all concentric circumferential segments 830 or 930 may not be necessarily different from each other. Some concentric circumferential segments 830 or 930 positioned next to or near each other may have the same or substantially identical widths.

Furthermore, the widths, in a radial direction RD, of the slots 820 or 920, which are spaces formed between the concentric circumferential segments 830 or 930, may be also varied. The slots 820 or 920 formed between the concentric circumferential segments 830 or 930 may have various widths. For example, the width of each slot 820 or 920 may be changed depending on a distance from the support 210 to each slot 820 or 920. For example, the widths of the slots 820 or 920 may be varied (e.g. increased or decreased) linearly, exponentially or logarithmically. In another example, the resonator 800 or 900 may have a sinusoidally varying width profile where the widths of the slots 820 or 920 alternate between wide and narrow.

The single central support 210 is shown in FIGS. 2A, 2B, 3A, 3B, 8 and 9. However, other mounting configurations using one or more additional or alternate mounting supports are also possible.

Figure 10A:
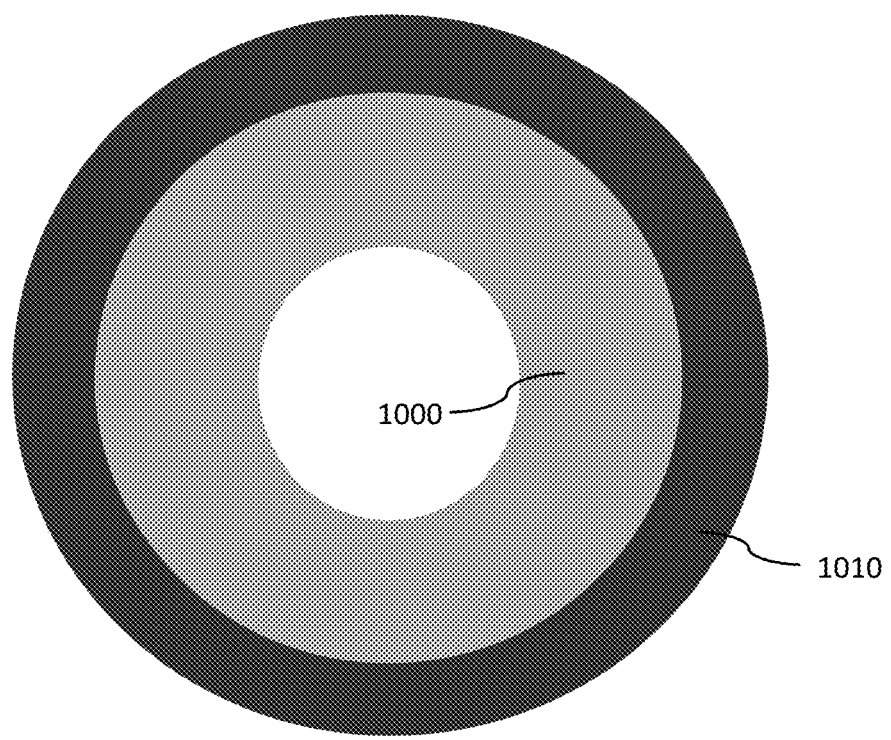
FIGS. 10A and 10B illustrate exemplary embodiments where an outer edge of a resonator is mounted circumferentially to a support.
Figure 10B:
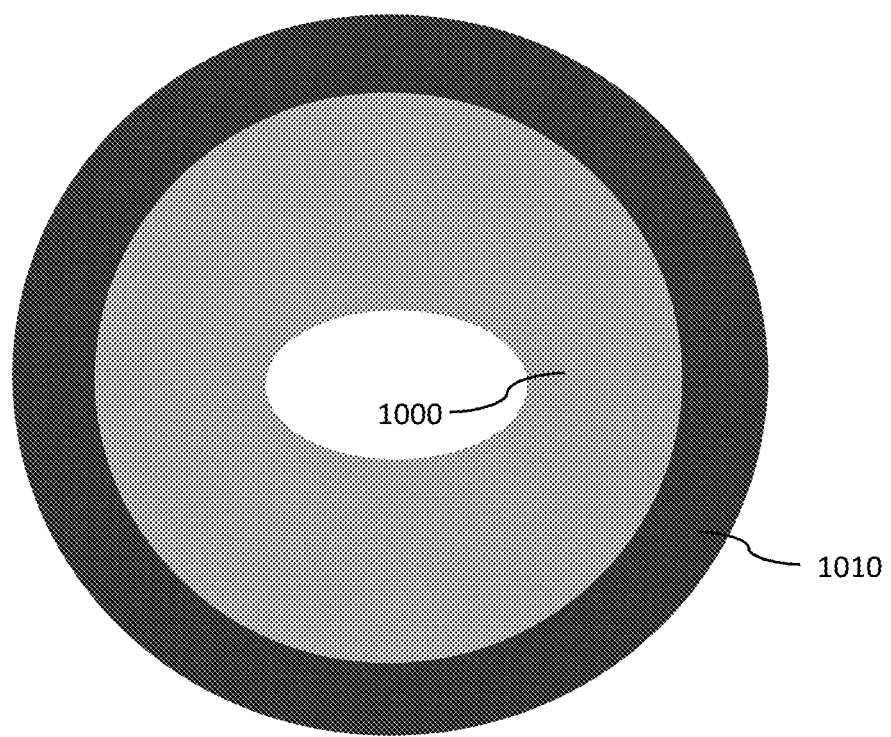

For example, FIGS. 10A and 10B illustrate exemplary embodiments that an outer edge of a resonator is mounted circumferentially to a support. FIG. 10B shows the resonator 1000 deformed during resonance while the anchor 1010 remaining the same as shown in FIG. 10A. The outer edge of a resonator 1000 may be coupled to a circumferential support 1010. As described with respect to FIGS. 2A, 2B, 3A, 3B, 8 and 9, the widths, in a radial direction, of the concentric circumferential segments of the resonator 1000 may be varied. The width of each concentric circumferential segment of the resonator 1000 may be changed depending on, for example, but not limited to, a distance from the circumferential support 1010 to each concentric circumferential segment of the resonator 1000. In some exemplary embodiments of the present disclosure, the widths of the concentric circumferential segments of the resonator 1000 may be varied linearly, exponentially or logarithmically. For example, the widths of the concentric circumferential segments of the resonator 1000 may be increased or decreased linearly, exponentially or logarithmically from the circumferential support 1010 in an inward radial direction, for instance, toward the inner edge of the resonator 1000. In another example, the resonator 1000 may have a sinusoidally varying width profile where the widths of the concentric circumferential segments of the resonator 1000 alternate between wide and narrow.

Figure 11A:
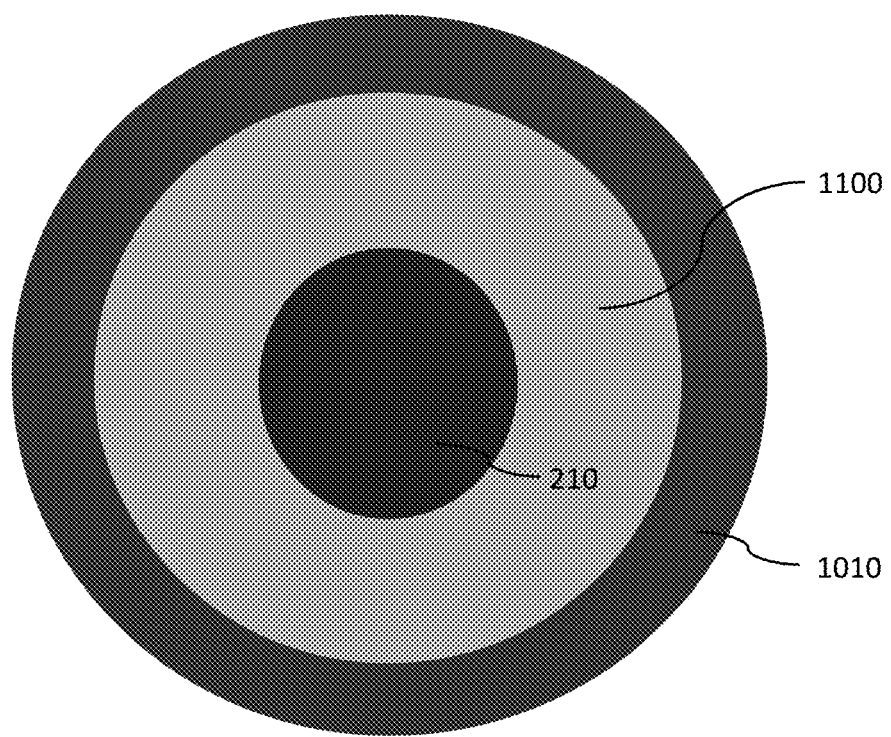
FIG. 11A shows an exemplary embodiment of a resonator supported by a plurality of supports.
Figure 11B:
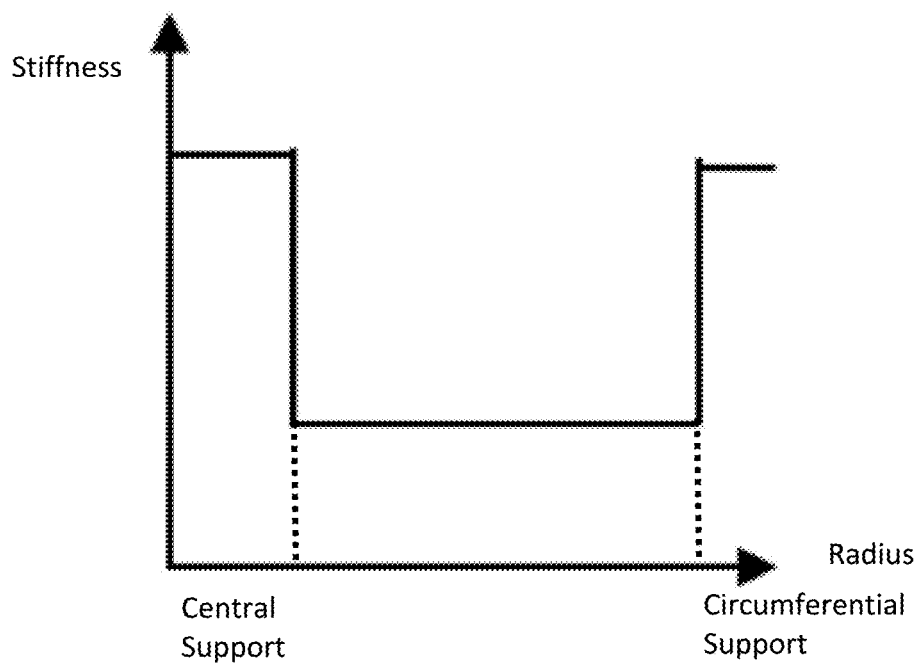
FIGS. 11B-11D show various types of stiffness profiles of a resonator supported by a plurality of supports according to exemplary embodiments of the present disclosure.
Figure 11C:
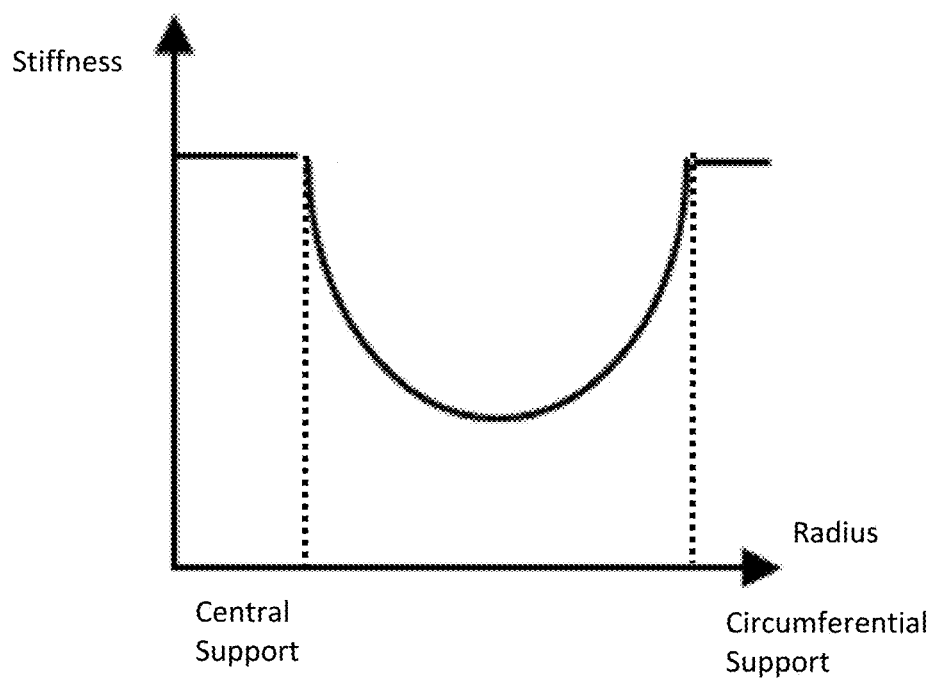
Figure 11D:
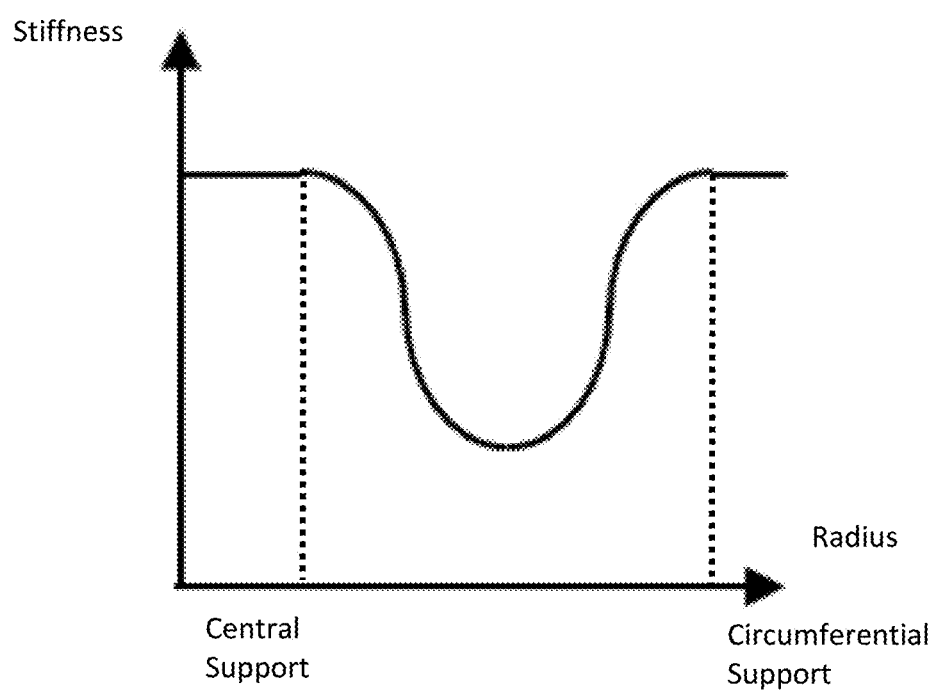

FIG. 11A shows an exemplary embodiment of a resonator supported by a plurality of supports (e.g. inner and outer supports). A resonator 1100 may be supported by both the central support 210 and the circumferential support 1010. The innermost concentric circumferential segment of the resonator 1100 is coupled to the central support 210 and the outermost concentric circumferential segment of the resonator 1100 is coupled to the circumferential support 1010. The widths, in a radial direction, of the concentric circumferential segments and/or slots of the resonator 1100 may be varied. The width of each concentric circumferential segment of the resonator 1100 may be changed depending on, for example, but not limited to, a distance from one or both of the central support 210 and the circumferential support 1010 to each concentric circumferential segment of the resonator 1100. For instance, the widths of the concentric circumferential segments are decreased or increased from the innermost and outermost concentric circumferential segments to one of the concentric circumferential segments disposed between the innermost and outermost concentric circumferential segments, for example, but not limited to, a concentric circumferential segment positioned at a middle between the central support 210 and the circumferential support 1010. The resonator 1100 may have various types of stiffness profiles by varying widths of concentric circumferential segments as shown in FIGS. 11B-11D. The smoothness of stiffness transitions may improve the gyroscope performance. For example, the better performance may be shown from FIG. 11B to FIG. 11C to FIG. 11D.

Figure 12:
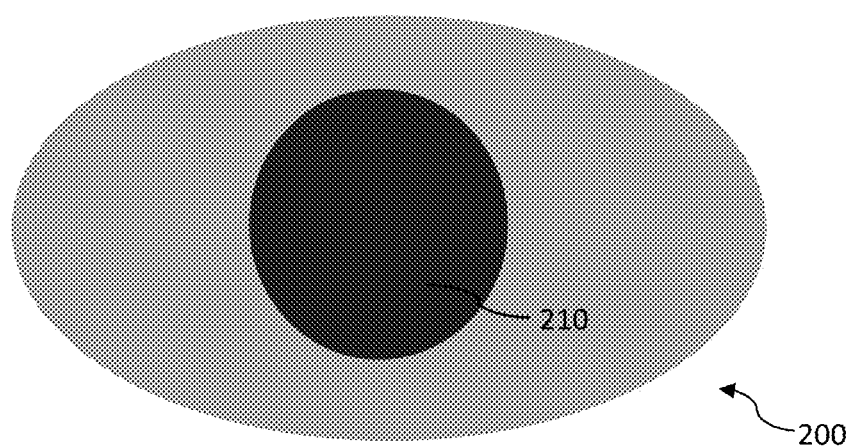
FIG. 12 shows a schematic top view of a resonator according to another exemplary embodiment of the present disclosure.

Although the exemplary resonator 200 is shown as a disk, other planar shapes and geometries using internal sensing and actuation (e.g. the shapes shown in FIGS. 10B and 12) are also possible applying principles of the present disclosure.

By varying (e.g. increasing, decreasing or alternatively changing) the width of each concentric circumferential segment of the resonator, such as a ring structure, and/or each slot of the resonator, the stiffness of the resonator may be tuned to improve the Q-factor by lowering anchor loss.

Although the example embodiments have been described in detail, it should be understood that various changes, substitutions and alterations can be made herein without departing from the spirit and scope of the application as defined by the appended claims.

Moreover, the scope of the present application is not intended to be limited to the particular embodiments of the process, machine, manufacture, and composition of matter, means, methods and steps described in the specification. As one of ordinary skill in the art will readily appreciate from the disclosure, processes, machines, manufacture, compositions of matter, means, methods or steps, presently existing or later to be developed, that perform substantially the same function or achieve substantially the same result as the corresponding embodiments described herein may be utilized according to the embodiments and alternative embodiments. Accordingly, the appended claims are intended to include within their scope such processes, machines, manufacture, compositions of matter, means, methods, or steps.

What is claimed is:

1. An apparatus, comprising:
   a resonator comprising a plurality of concentric circumferential segments and a plurality of slots formed between the concentric circumferential segments; and
   at least one support supporting the resonator,
   wherein a width, in a radial direction, of each of the concentric circumferential segments is varied depending on a distance from the at least one support to the each of the concentric circumferential segments.

2. The apparatus of claim 1, wherein widths of the concentric circumferential segments are decreased from the at least one support in the radial direction.

3. The apparatus of claim 1, wherein widths of the concentric circumferential segments are linearly decreased from the at least one support in the radial direction.

4. The apparatus of claim 1, wherein widths of the concentric circumferential segments are logarithmically or exponentially decreased from the at least one support in the radial direction.

5. The apparatus of claim 1, wherein the at least one support is coupled to at least one of the concentric circumferential segments, and widths of the concentric circumferential segments are decreased from the at least one of the concentric circumferential segments coupled to the at least one support.

6. The apparatus of claim 1, wherein the at least one support is disposed at a center of the resonator, and widths of the concentric circumferential segments are decreased from an inner concentric circumferential segment to an outer concentric circumferential segment.

7. The apparatus of claim 6, wherein a decremental rate of the widths of the concentric circumferential segments is constant.

8. The apparatus of claim 6, wherein a decremental rate of the widths of the concentric circumferential segments is gradually decreased from the inner concentric circumferential segment to the outer concentric circumferential segment.

9. The apparatus of claim 1, wherein widths of the concentric circumferential segments are increased from the at least one support in the radial direction.

10. The apparatus of claim 1, wherein widths of the concentric circumferential segments are linearly increased from the at least one support in the radial direction.

11. The apparatus of claim 1, wherein widths of the concentric circumferential segments are logarithmically or exponentially increased from the at least one support in the radial direction.

12. The apparatus of claim 1, wherein the at least one support is coupled to at least one of the concentric circumferential segments, and widths of the concentric circumferential segments are increased from the at least one of the concentric circumferential segments coupled to the at least one support.

13. The apparatus of claim 1, wherein the at least one support is disposed at a center of the resonator, and widths of the concentric circumferential segments are increased from an inner concentric circumferential segment to an outer concentric circumferential segment.

14. The apparatus of claim 1, wherein the at least one support is disposed adjacent to an outer edge of the resonator, and widths of the concentric circumferential segments are decreased from the outer edge of the resonator toward an inward radial direction.

15. The apparatus of claim 1, wherein the at least one support is disposed adjacent to an outer edge of the resonator, and widths of the concentric circumferential segments are increased from the outer edge of the resonator toward an inward radial direction.

16. The apparatus of claim 1, wherein the at least one support comprises:
   an inner support coupled to an inner concentric circumferential segment of the concentric circumferential segments; and
   an outer support coupled to an outer concentric circumferential segment of the concentric circumferential segments,
   wherein widths of the concentric circumferential segments are decreased from the inner and outer concentric circumferential segments to one of the concentric circumferential segments disposed between the inner and outer concentric circumferential segments.

17. The apparatus of claim 1, wherein the at least one support comprises:
   an inner support coupled to an inner concentric circumferential segment of the concentric circumferential segments; and
   an outer support coupled to an outer concentric circumferential segment of the concentric circumferential segments,
   wherein widths of the concentric circumferential segments are increased from the inner and outer concentric circumferential segments to one of the concentric circumferential segments disposed between the inner and outer concentric circumferential segments.

18. The apparatus of claim 1, wherein a width, in a radial direction, of each of the slots is varied depending on a distance from the at least one support to the each of the slots.

19. The apparatus of claim 1, further comprising radial segments connecting between the concentric circumferential segments.

20. The apparatus of claim 1, wherein the concentric circumferential segments have a ring shape.

* * * * *